March 10, 1936.  P. R. FOLLIS  2,033,572
CLUTCH CONTROL MECHANISM
Filed Feb. 29, 1932  2 Sheets-Sheet 2
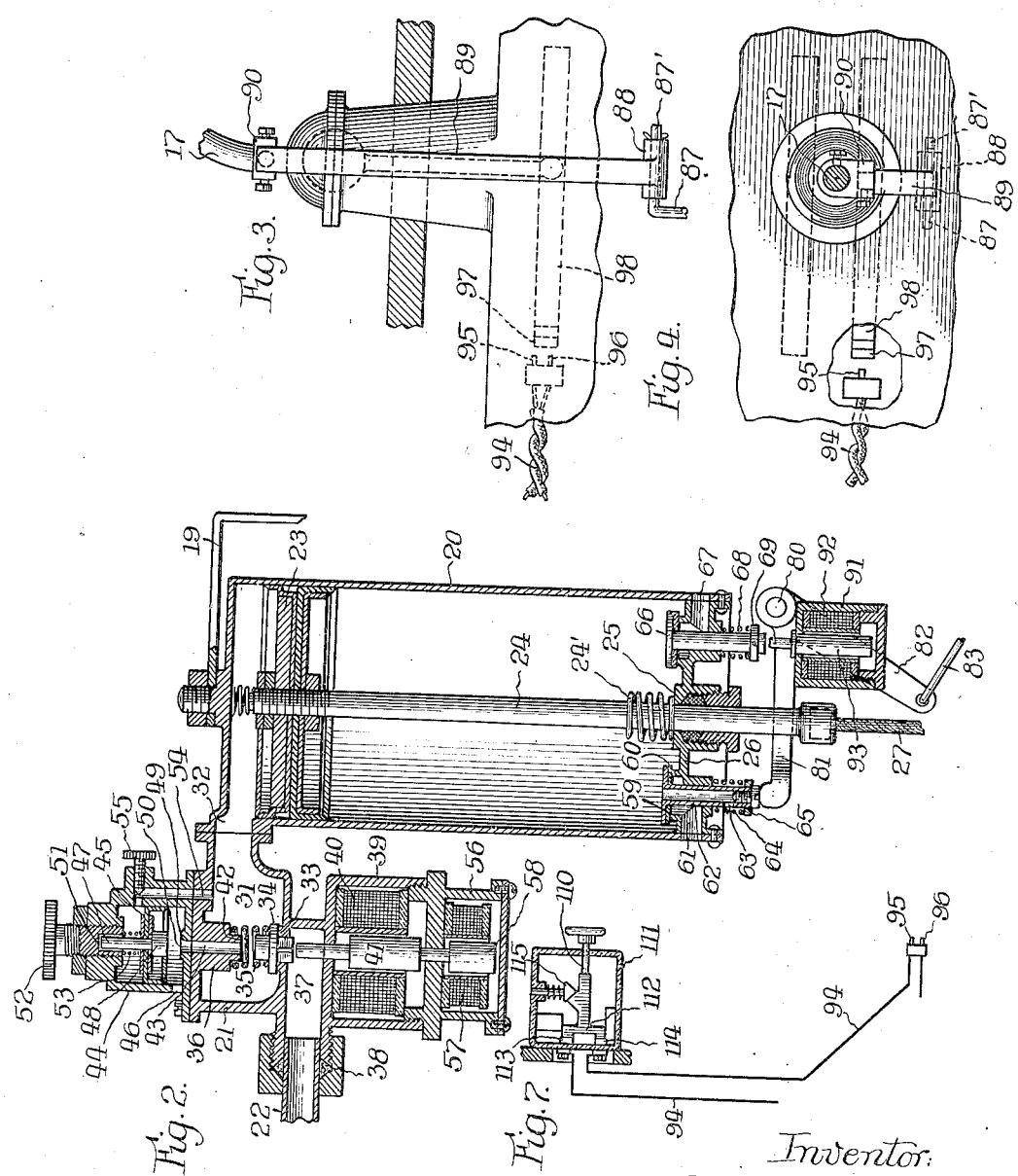
Inventor:
Paul R. Follis,
By Fisher, Clapp, Soans & Pond
Attys.

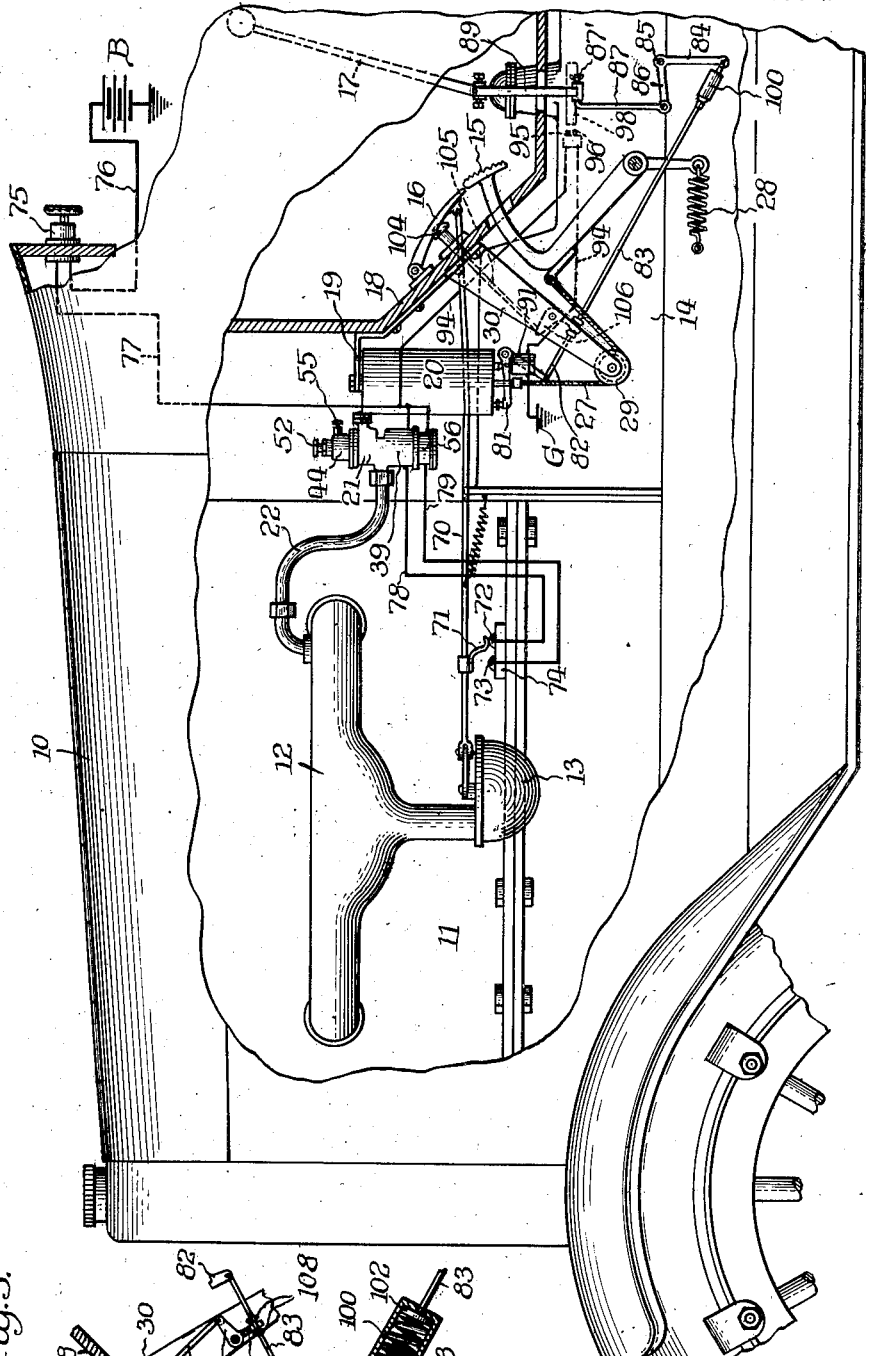

Patented Mar. 10, 1936

2,033,572

UNITED STATES PATENT OFFICE 2,033,572

CLUTCH CONTROL MECHANISM

Paul R. Follis, Paducah, Ky.

Application February 29, 1932, Serial No. 595,738

14 Claims. (Cl. 192—.01)

This invention relates to apparatus for controlling the opening and closing movements of clutches, and has been designed more especially, although not exclusively, for automobile practice.

The main object of the invention is to provide a mechanical clutch control mechanism which can be adapted for universal use on automobiles, tractors, buses, and the like, and may either be added by the user or built in by the manufacturer, one object being to provide an improved device for relieving the driver of the usual physical effort of disengaging and engaging the clutch during the necessary operations of the latter in starting, stopping and changing speed.

Clutch control mechanisms wherein the clutch is opened or disengaged by the motor itself through the agency of a vacuum motor, the cylinder of which may be thrown into communication with the intake manifold, and the piston of which is mechanically connected to the clutch, are old and known, and have, to some extent, been introduced into practice. It has also been proposed to provide in addition means to suitably control the closing or engaging movement of the clutch and to properly relate its speed of engagement with the speed of travel of the car itself so as to cause the clutch to pick up the load without either a forward or a backward jerk, which is distinctly unpleasant to the occupants of the car. A complete cycle of clutch operation at present performed by the foot may be divided into four movements, as follows. First, a quick forward action for disengaging; second, a partial return movement to the point of initial engagement of the clutch members; third, a retarded return movement permitting more or less slip of the clutch members to properly synchronize the clutch movement with the car speed; and, fourth, final inward movement during which the clutch members are fully engaged and the load is fully picked up. In the design of the present invention I have provided novel valve mechanism controlled in part by the accelerator and in part by the gear shift lever for so regulating the discharge of air from the cylinder of the vacuum motor during the return or engaging movement of the clutch as to properly effect the engaging movement of the clutch and proportion the same to the varying speeds of the car when passing from low gear to intermediate and from intermediate to high, so as to produce a smooth and indistinguishable pick-up of the load by the clutch and avoid sudden accelerations or jerks when passing from a lower to a high speed or vice versa.

The invention, its manner of operation, and the benefits and advantages inherent therein will be readily understood and appreciated by persons skilled in the art from the following detailed description, taken in connection with the accompanying drawings in which I have illustrated one simple and practical embodiment of the underlying principle of the invention, and wherein—

Fig. 1 is a side elevation of the equipment as applied to an automobile, with parts broken away and in section.

Fig. 2 is an enlarged axial section through the vacuum motor and its controlling valves and solenoids.

Fig. 3 is an enlarged side elevation of the lower portion of the gear shift lever and gear box, illustrating attachments thereto for modifying the dash-pot action of the vacuum motor during the engaging movement of the clutch.

Fig. 4 is a top plan view of Fig. 3 in section through the gear shift lever.

Figs. 5 and 6 are detail views of an accessory device for slowing up clutch engagement when coasting in higher gears.

Fig. 7 is a detail view of a circuit controller which may be employed for the same purpose as the device of Figs. 5 and 6.

Referring now to the drawings, 10 indicates generally the forward or motor housing portion of an automobile, 11 designates the motor casing, 12 the intake manifold, 13 the carburetor, 14 the clutch housing, 15 the clutch pedal, 16 the accelerator pedal, and 17 the gear shift lever; all these parts being as usual.

Suitably attached to the forward side of the foot board 18, as by means of a rigid bracket 19 is the vertical cylinder 20 of a vacuum motor. The upper end of cylinder 20 communicates through a control valve housing 21 and a pipe line 22, with the intake manifold 12 of the engine. Referring to Fig. 2, slidable within the cylinder 20 is a piston 23, the stem 24 of which extends through a packing box 25 in the bottom wall 26 of the cylinder and is connected by a flexible cord or cable 27 to the clutch pedal 15, which latter is normally urged into clutch-engaging position by the usual spring 28 (Fig. 1). The cable 27 is trained over a guide pulley 29 mounted in the lower end of a depending strut 30 attached to the foot board 18. It will thus be seen that when the pipe 22 is placed in free communication with the upper end of the cylinder 20, with the engine running, the piston 23 will be drawn to the top of the cylinder, and the clutch pedal 15 will be drawn forwardly to full clutch disengaging position.

Referring now to Fig. 2, it will be seen that the control valve housing 21 is formed with an upper chamber 31 that registers with a port 32 in the upper end of the cylinder 20. The bottom wall of chamber 31 is formed with an annular valve seat 33, on which seats the main control valve 34 that is normally held to its seat by a thrust spring 35 footed against a depending boss 36 formed on the top wall of the chamber 31. The port controlled by the valve 34 opens into a lateral passage 37, to the outer end of which the pipe 22 is connected by means of a suitable packing 38. Manifestly, the opening of the valve 34 places the upper end of the cylinder 20 in free communication with the intake manifold 12 through pipe 22, passage 37, chamber 31 and port 32.

In the lower portion of the valve housing 21 is formed a chamber 39 housing a solenoid magnet field 40 and plunger 41. The reduced upper end portion of the plunger 41 passes through a hole in the top wall of the chamber 39 and is adapted, when the magnet is energized, to strike and quickly raise the valve 34 and carry the upper reduced end of the latter against an upper valve seat 42 that controls a vertical air passage 43 extending through the boss 36. Mounted on the upper end of the housing 21 is a cylinder 44 containing a piston 45, the cup leather of which slidably engages with the internal wall of the cylinder 44. 46 designates a lateral air port in the lower end of the cylinder 44. On the lower end of the stem 47 of the piston 45 is a disc valve 48 that forms a draft check valve and cooperates with a valve seat 49 formed on the bottom wall of the cylinder 44 and surrounding a port 50 that registers with the upper end of the air passage 43. The upper end of the stem 47 is guided in a socket 51 formed in the lower end of a regulating screw 52 mounted in the top wall of the cylinder 44, and a thrust spring 53 encircling the stem 47 and footed on the lower end of the screw 52 normally urges the piston 45 and valve 48 to closed position. The space in the cylinder 44 above the piston 45 is normally vented to the main valve chamber 31 by a passage 54, the size of which is regulated by an adjusting screw 55.

Attached to the lower end of the magnet housing 39 is a second magnet housing 56 containing a solenoid magnet field 57 and plunger 58. The upper reduced end of the plunger 58 slidably engages a hole in the top wall of the casing 56 and abuts against the lower end of the upper solenoid plunger 41. It may here be explained that the plunger 58 of the lower magnet is designed to have a considerably shorter throw than the plunger of the upper magnet, for a purpose later explained.

Referring again to the vacuum motor, the bottom wall 26 of the cylinder 20 is equipped with a pair of valves, the function of which is to permit free entrance of air to the cylinder as the piston 23 rises, and to regulate the escape of the trapped air after the fashion of a dash-pot, as the piston descends so as to effect variable speed clutch engaging movements. An air intake valve 59 equipped with a suitable leather or rubber facing 60, controls a lateral air passage 61 in the lower end of the cylinder wall, and the stem 62 of said valve is hollow and is formed with a lateral vent port 63 below the stem bearing, to provide a restricted air outflow duct. The valve is normally held to its seat by a light spring 64 footed on the lower end of the stem bearing and on a head 65 on the lower end of the stem.

The other air intake valve 66 is generally similar to the valve 59, and normally closes a lateral air passage 67 similar to the passage 61. The stem of valve 66, however, is solid and the valve is normally held seated by a light spring 68 confined between the lower end of the stem bearing and a head 69 on the lower end of the valve stem. A spring 24' encircling piston rod 24 and stepped on packing box 25 serves to float or arrest the piston 23 with a slight clearance at the bottom of the cylinder.

Referring to Fig. 1, 70 designates the push rod connection between the accelerator pedal 16 and the carburetor 13. Attached to the rod 70 is a circuit opening and closing contact finger 71. This contact finger cooperates with a pair of spaced contact buttons 72 and 73 mounted on an insulated support 74. On the instrument board of the car is a master switch designated as an entirety by 75. This switch is connected on one side through a lead 76 to a battery B, or other source of electric current, and on its other side by a lead 77 and branch leads 78 and 79 to the contacts 72 and 73, respectively. The leads 78 and 79 extend through the magnets 40 and 57, respectively, and when the master switch is closed and the finger 71 is in contact with the button 72, the magnet 40 is energized, and when said finger is in contact with the button 73, the magnet 57, is energized; the current being grounded in both cases through the push rod and carburetor. In the idle or fully retracted position of the accelerator pedal 16, the finger 71 is in contact with the button 72, so that, if the master switch 75 is closed, the magnet 40 is energized, and the main control valve 34 is raised, opening the passage from the manifold to the vacuum motor and closing the air passage 43, so that, with the motor running, the clutch pedal 15 is instantly drawn forward, opening the clutch.

During the clutch closing or re-engaging movement, the piston 23 descends, expelling the body of air beneath, and in order that this movement of the piston may be most retarded while the car in low gear is starting from a standstill to low speed, and may move more rapidly while the car, in second gear, is accelerating from low gear speed to second gear speed, and may be still more accelerated while the car, in high gear, is accelerating from intermediate to high speed, I have provided means, next to be described, for suitably controlling the valves 59 and 66 to obtain these results.

Referring to Fig. 2, fast on a suitably journaled rock shaft 80 slightly below the cylinder 20 is an arm 81, the free end of which underlies the lower end of the valve stem 62 in a position to raise the valve 59. Also fast on rock shaft 80 is a depending arm 82 connected by a link 83 (Fig. 1) to one arm 84 of a bell crank lever that is suitably pivoted at 85. To the other arm 86 of said bell crank lever is pivoted a link 87 formed with a laterally bent end 87' that, as most clearly shown in Figs. 3 and 4, is pivotally mounted in a bearing sleeve 88, on the lower end of a bent arm 89, which latter at its upper end carries a collar 90 embracing and keyed to the gear shift lever 17. The connection of the arm 89 to the gear shift lever 17 is such that fore and aft movements of the gear shift lever do not effect any substantial up and down movements of the arm 89, while lateral or side movements of the gear shift lever do cause up and down movements of the arm 89. When the lever 17 is shifted sidewise to the left, as in the standard gear shift, the slight downward movement of the arm 89 caused thereby, through the described connections, merely rocks the arm 81 slightly downwardly, so that it does not affect the valve 59. Thus, when the car is in low gear or reverse, the only vent of the cylinder 20 is through the hollow valve stem 62. However, in placing the car in intermediate or second speed, the gear shift lever 17 is shifted sidewise to the right. This causes an upward movement of the arm 89 and, through the described connections, causes the arm 81 to lift the valve 59 off its seat, so that the cylinder 20 is then vented more freely through the passage 61.

When the transmission has been shifted into high gear, not only does the valve 59 remain open, but the other valve 66 is opened by means of a solenoid magnet underlying the valve, or it may be opened mechanically if desired. This magnet is clearly shown in Fig. 2 wherein 91 is the magnet casing, 92 the field, and 93 the solenoid plunger, the upper reduced end of which underlies the stem of the valve 66. This magnet 92 is included in a branch circuit 94 (Fig. 1) from the circuit line 77, the circuit line 94 being suitably grounded, as indicated at G in Fig. 1, and including a pair of spaced contact points 95 and 96 (Figs. 1 and 4) lying opposite a circuit closing switch 97 mounted on and insulated from the forward end of one of the slidable gear supporting shafts 98 of the variable speed transmission gearing, so that, as the gear shift lever is thrown into the highest gear, the circuit is closed through the magnet 92, the valve 66 is instantly raised, and the cylinder 20 is vented through both passages 61 and 67, thus permitting a comparatively rapid clutch engaging movement between intermediate and high speeds. In this way the speed of the clutch engaging movement is brought into proportion with the car speed, so that the clutch picks up the load smoothly and without any appreciable abruptness in the car travel.

It remains to briefly describe the operation and function of the piston 45 and auxiliary air valve 48. Manifestly, when the suction is thrown onto the vacuum motor by a quick opening movement of the main valve 34, the air passage 43 must be closed, and this is done by the upper face of the valve 34 contacting with the valve seat 42. At the same time that the piston 23 is raised, the vacuum acting through passage 54 raises the piston 45 and valve 48, thus opening passage 43 to the atmosphere through port 46. The instant magnet 40 or 57 is de-energized, the main valve 34 instantly re-seats itself on seat 33 under the suction and the thrust of spring 35, and air flows into the top of cylinder 20 through port 46, passage 43, chamber 31 and port 32, permitting access of atmospheric pressure to the top of piston 23. During the descending movement of piston 23, piston 45 carrying valve 48 descends comparatively slowly under the thrust of spring 53 so that, by the time the motor piston 23 has come to rest, with the clutch fully engaged, valve 48 has re-seated itself, and the cycle of the vacuum motor is completed. Now, the rate of speed of the closing movement of valve 48 can be nicely regulated by manipulating the adjusting screws 52 and 55 so as to cut off the inflow of air to cylinder 20 above piston 23 sooner or later in the descending movement of piston 23, and thus, by creating a partial vacuum above the piston, to more or less retard the clutch-engaging movement. The valve 48 is thus a sort of draft check valve ancillary to the valve mechanism in the bottom of cylinder 20, for regulating the amount of slip permitted to the clutch in closing. It is not an indispensable or necessary adjunct of the device, but is preferably employed as it enables the clutch-closing movement of piston 23 to be controlled by both regulable plenum below the piston and regulable vacuum above the piston.

Briefly describing the operation of placing the car from a standstill into high speed, and assuming that the car is at rest, with the engine running and with the master switch 75 open, and the accelerator pedal 16 in its normal fully retracted position, the circuit through the upper magnet 40 is closed at the contacts 71, 72 and open at the master switch. The master switch is then closed, which instantly closes the circuit, energizing magnet 40, and the plunger thereof shifts the main valve 34 off its lower seat 33 and against its upper seat 42. This places the upper end of the cylinder 20 into free communication with the suction in the manifold and draws piston 23 to the upper end of its cylinder, quickly opening the clutch. At the same time, the suction in the manifold acting through duct 54 raises piston 45 and valve 48. Gear shift lever 17 is then manipulated to place the transmission in low gear, and this merely rocks the arm 81 idly downwardly, as above described. Pressure on the accelerator pedal 16 first breaks the circuit through magnet 40 at 71, 72, which instantly reseats valve 34, closing the suction line to the manifold and opening the vent line above piston 23 to the atmosphere. This position of the parts is shown in Fig. 2. The piston 23 then descends, forcing the air ahead of it out through the hollow stem 62 of valve 59, which, at this point, is the sole vent. As the clutch approaches engaging position, the accelerator is pushed further inwardly, closing for an instant the circuit through magnet 57 at 71, 73. This gives a brief partial re-opening movement to valve 34, just sufficient to momentarily check or retard the movement of the piston 23 as the clutch members come into contact with each other, thus insuring an easy start through slip of the clutch members. Continued inward movement of the accelerator pedal, however, again cuts off the suction, and the clutch comes into full engagement during the final retarded descent of the piston 23.

As the transmission is shifted from low to intermediate, the valve 59 is raised by the arm 81, so that, during the next descent of the piston 23 the air is more freely vented through the passage 61, and the clutch-engaging movement is more rapid. As the transmission is next shifted from intermediate to high, the valve 57 remains open, and in addition the valve 66 is opened, so that the clutch moves even more quickly into fully engaged position, in accordance with the further increased speed which the car has attained. Each time a change of gear is made, the accelerator pedal 16 is, of course, released to avoid racing the engine, and, as the contacts 71 and 72 thus close the circuit through magnet 40, the clutch is instantly opened just in advance of the gear shifting operation.

My invention in its preferred and most complete form also includes means for slowing up the clutch engagement when the car is coasting or free-wheeling at high rates of speed with the transmission in intermediate or high, so as to avoid an unpleasant checking or retarding of the car movement as the clutch takes hold.

This is accomplished by independently operable means which causes a slower escape of air from the cylinder 20 than in the mechanism thus far described, by causing either or both of the valves 59 and 66 to be closed during the clutch-engaging movement. A mechanism which accomplishes this result by causing the closing of valve 59 is shown in Figs. 1, 5 and 6, and may comprise the following parts. Incorporated in the rod 83 is a resilient slip joint comprising a cylinder 100, one end of which is coupled at 101 to one section of the rod 83. The other section of the rod 83 slidably passes through a hole in the other end of cylinder 100 and carries a head 102. Interposed between the head 102 and the other end of the cylinder is a compression spring 103 that is stronger than the valve spring 64. Slidably mounted in the foot-board 18 at one side of the accelerator pedal 16 is a push knob 104, the stem 105 of which is pivoted to one arm 106 of an elbow-lever which may be pivoted on the strut 30 or other support, the other arm 107 of said lever having a forked free end straddling the rod 83 between a pair of buttons 108 fast on said rod. The operator with his foot on the accelerator pedal depresses the knob 104 by the edge of his foot an instant before the accelerator has stepped the motor up, and this retracts the upper section of rod 83 (the spring 103 yielding) thus lowering the arm 81 and permitting valve 69 to close and so choking the escape of the air and retarding the clutch-engaging movement and permitting ample clutch slippage to prevent shock or jar. At the same time, this accessory device does not interfere with the regular operation when changing gears.

Another device for the same purpose which may be used with, or independently of, the device last described, consists simply of an independent switch in the circuit 94 that energizes the magnet 91 to open valve 66 when the gear lever is shifted into high gear position. Any circuit make-and-break switch may be employed for this purpose, and in Fig. 7, I have illustrated a known type of switch comprising an insulated push-and-pull rod 110 mounted in a box 111 attached to the instrument board and carrying a switch bar 112 that co-operates with a pair of contacts 113 and 114, the switch bar being locked in on and off position by a spring-actuated dog 115. When this device is employed, and the car is coasting at a high rate of speed with the transmission in high, the driver may break the circuit line 94, thus permitting valve 66 to close and slow up the clutch engagement by further trapping air in cylinder 20, and so smoothing out any piling up action that might occur by reason of a too abrupt clutch engagement.

From the foregoing it will be seen that the clutch control herein shown and described will "free wheel" or disengage the clutch in all speeds smoothly and instantly, without braking the movement of the car as the foot is taken off the accelerator pedal, since the vacuum motor is instantly thrown into action to disengage the clutch as the foot lets up on the accelerator pedal, and no tendency for the clutch to keep pulling while in gear is sensed or felt, neither is any such action felt when shifting into another gear. Nor is there the likelihood that the driver may be caught between neutral and actual gear engagement with the clutch not disengaged, as can be the case in mechanically controlled valves because of their slow opening and closing.

By merely opening the master switch 75, the device may be rendered idle, and the car operated by foot in the usual manner. The most salient advantages of the present improvement lie in the saving of tiresome clutch pedaling, the prevention of slipping in higher gears and grabbing in lower gears, and the smooth and easy acceleration of car speed when starting and shifting gears.

I claim:

1. The combination with an automobile motor, a clutch pedal, and a gear shift lever, of a cylinder, a piston in said cylinder connected to said clutch pedal for opening the clutch, a suction pipe connecting said cylinder on one side of said piston with the intake manifold of the motor, a suction control valve in said pipe, a pair of self-closing air intake valves for said cylinder, means affording a restricted air vent for said cylinder, and means put in operation by said gear shift lever for opening one or both of said valves to speed up the outflow of air from said cylinder.

2. The combination with an automobile motor, a clutch pedal, and a gear shift lever, of a cylinder, a piston in said cylinder connected to said clutch pedal for opening the clutch, a suction pipe connecting said cylinder on one side of said piston with the intake manifold of the motor, a suction control valve in said pipe, a self-closing air intake valve formed with a duct effecting a restricted outflow of air from said cylinder on the other side of said piston, an additional self-closing air intake valve, and means put in operation by said gear shift lever for successively opening said valves to speed up the outflow of air from said cylinder.

3. The combination with an automobile motor, a clutch pedal, and a gear shift lever, of a cylinder, a piston in said cylinder connected to said clutch pedal for opening the clutch, a suction pipe connecting said cylinder on one side of said piston with the intake manifold of the motor, a suction control valve in said pipe, a self-closing air intake valve for said cylinder, means affording a restricted air vent for said cylinder, mechanical means operated by said gear shift lever for opening said valve to speed up the outflow of air from said cylinder, an additional self-closing air intake valve, an electric circuit including a magnet for opening said additional valve, and a switch in said circuit actuated by said gear shift lever.

4. The combination with an automobile motor, a clutch pedal, and a gear shift lever, of a cylinder, a piston in said cylinder connected to said clutch pedal for opening the clutch, a suction pipe connecting said cylinder on one side of said piston with the intake manifold of the motor, a suction control valve in said pipe, a self-closing air intake valve for said cylinder, means affording a restricted air vent for said cylinder, mechanical means operated by said gear shift lever for opening said valve to speed up the outflow of air from said cylinder, and means for releasing said valve from the action of said last-named means and permitting it to close when desired.

5. The combination with an automobile motor, a clutch pedal, and a gear shift lever, of a cylinder, a piston in said cylinder connected to said clutch pedal for opening the clutch, a suction pipe connecting said cylinder on one side of said piston with the intake manifold of the motor, a suction control valve in said pipe, a self-closing air intake valve for said cylinder, means affording a restricted air vent for said cylinder, an electric circuit including a magnet for opening said valve, a switch in said circuit actuated by said gear shift lever, and another switch in said circuit independent of said gear shift lever for de-energizing said magnet and permitting said valve to close when desired.

6. The combination with an automobile motor, a clutch pedal, and an accelerator, of a cylinder, a piston in said cylinder connected to said clutch pedal for opening the clutch, a suction pipe connecting said cylinder with the intake manifold of the motor, a self-closing valve in said suction pipe, and electrically actuated means controlled by said accelerator for effecting opening movements of said valve of varying extent.

7. The combination with an automobile motor, a clutch pedal, and an accelerator, of a cylinder, a piston in said cylinder connected to said clutch pedal for opening the clutch, a suction pipe connecting said cylinder with the intake manifold of the motor, a self-closing valve in said suction pipe, and electrically actuated means controlled by said accelerator for effecting successive full and partial opening movements of said valve in retracted and advanced positions respectively of said accelerator.

8. The combination with an automobile motor, a clutch pedal, and an accelerator, of a cylinder, a piston in said cylinder connected to said clutch pedal for opening the clutch, a suction pipe connecting said cylinder with the intake manifold of the motor, a self-closing valve in said suction pipe, a magnet for opening said valve, an electric circuit for energizing said magnet, spaced contacts in said circuit, and a switch connected to and operated by said accelerator, said switch closing the circuit through one of said contacts in the retracted position of said accelerator and through the other of said contacts in a forward position of said accelerator.

9. The combination with an automobile motor, a clutch pedal, a carburetor, an accelerator pedal, and a rod connecting said accelerator pedal to said carburetor, of a cylinder, a piston in said cylinder connected to said clutch pedal for opening the clutch, a suction pipe connecting said cylinder with the intake manifold of the motor, a self-closing valve in said suction pipe, a magnet for opening said valve, an electric circuit for energizing said magnet, spaced contacts in said circuit, and a switch mounted on said rod, said switch closing the circuit through one of said contacts in the retracted position of said accelerator pedal and through the other of said contacts in an advanced position of said accelerator pedal.

10. The combination with an automobile motor, a clutch pedal, a carburetor, an accelerator pedal, and a rod connecting said accelerator pedal to said carburetor, of a cylinder, a piston in said cylinder connected to said clutch pedal for opening the clutch, a suction pipe connecting said cylinder with the intake manifold of the motor, a self-closing valve in said suction pipe, tandem magnets of greater and less throw respectively for opening said valve, an electric circuit including parallel branches for energizing said magnets, spaced contacts in the respective branches, and a switch mounted on said rod, said switch closing the circuit through one of said contacts in the retracted position of said accelerator pedal and through the other of said contacts in an advanced position of said accelerator pedal.

11. The combination with an automobile motor, and a clutch pedal, of a cylinder, a piston in said cylinder connected to said clutch pedal for opening the clutch, a suction pipe connecting said cylinder on one side of said piston with the intake manifold of the motor, a suction control valve in said pipe, means for venting the vacuum in said cylinder during the return movement of said piston, a draft check valve controlling said venting means, and means for regulating the speed of the closing movement of said draft check valve.

12. The combination with an automobile motor, and a clutch pedal, of a cylinder, a piston in said cylinder connected to said clutch pedal for opening the clutch, a suction pipe connecting said cylinder on one side of said piston with the intake manifold of the motor, a suction control valve in said pipe, means for venting the vacuum in said cylinder during the return movement of said piston, a draft check valve controlling said venting means, suction-actuated means for opening said draft check valve, and a spring urging said draft check valve to closed position.

13. The combination with an automobile motor, and a clutch pedal, of a cylinder, a piston in said cylinder connected to said clutch pedal for opening the clutch, a suction pipe connecting said cylinder on one side of said piston with the intake manifold of the motor, a suction control valve in said pipe, means for venting the vacuum in said cylinder during the return movement of said piston, a draft check valve controlling said venting means, suction-actuated means for opening said draft check valve, means for varying the suction pull on said suction-actuated means, a spring urging said draft check valve to closed position, and means for varying the tension of said spring.

14. The combination with an automobile motor, and a clutch pedal, of a cylinder, a piston in said cylinder connected to said clutch pedal for opening the clutch, a suction pipe connecting said cylinder on one side of said piston with the intake manifold of the motor, a normally closed self-closing suction control valve in said pipe, a manually controlled magnet for opening said valve, means for effecting restricted outflow of air from said cylinder on the other side of said piston during the return movement of the latter, and regulable means structurally independent of said suction control valve for venting the vacuum in said cylinder during said return movement.

PAUL R. FOLLIS.